Figure 3:
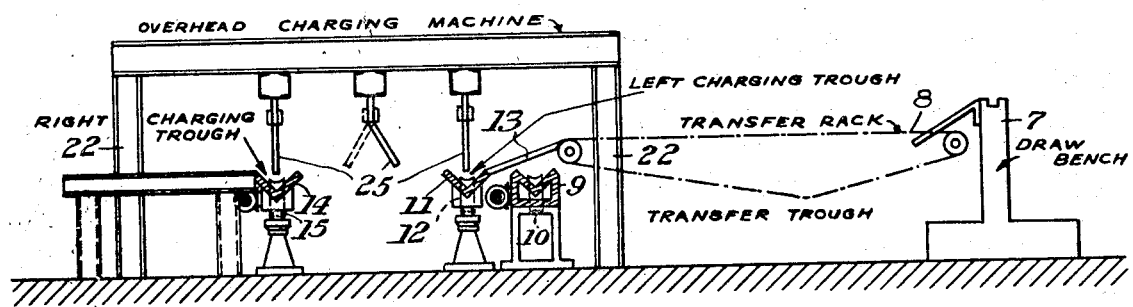

March 24, 1931.  A. S. KAMERER  1,797,348
APPARATUS FOR AND METHOD OF HANDLING SKELP
Filed Feb. 21, 1929  2 Sheets-Sheet 1
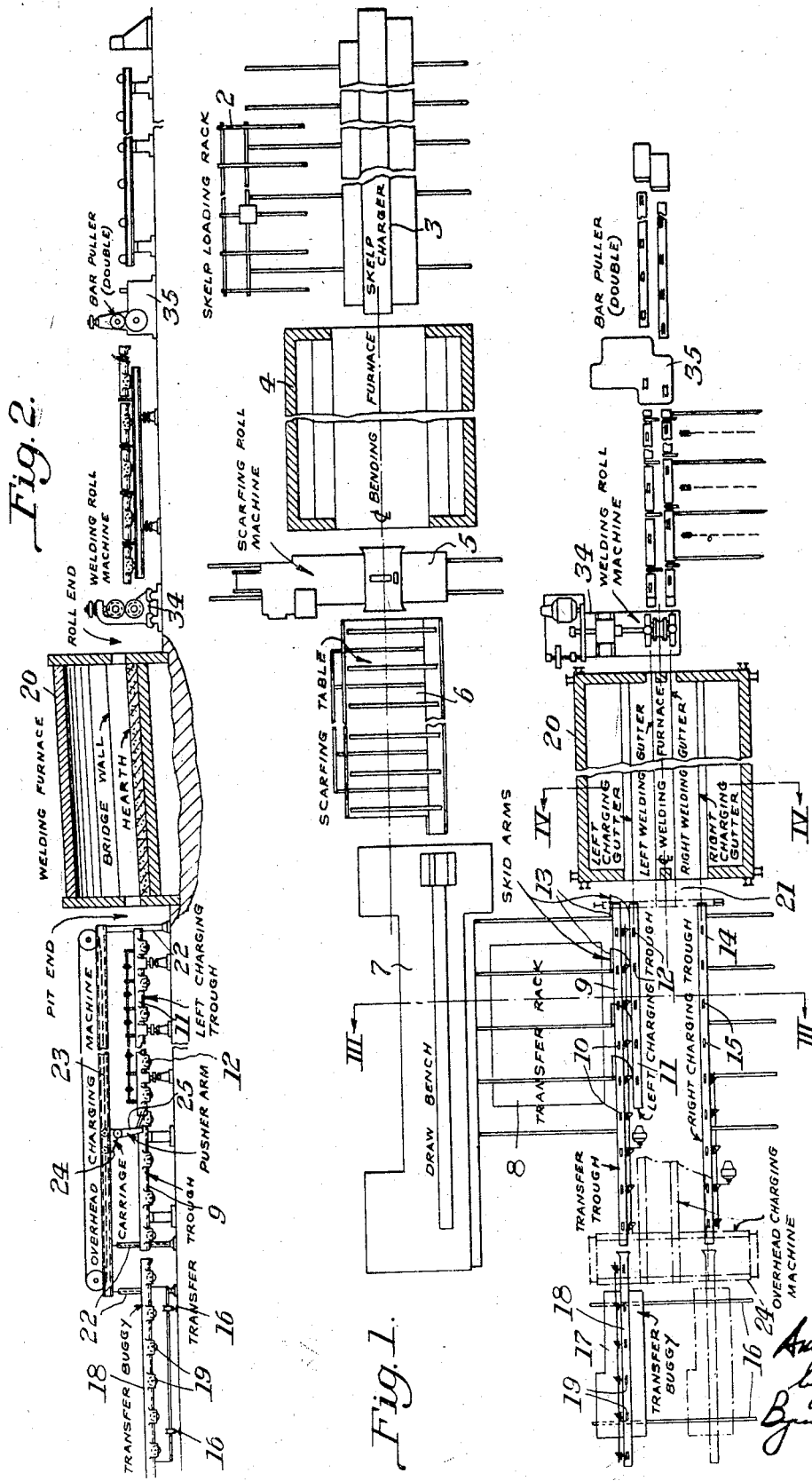

Patented Mar. 24, 1931

1,797,348

UNITED STATES PATENT OFFICE

AMOS S. KAMERER, OF MOUNT LEBANON, PENNSYLVANIA, ASSIGNOR TO A. M. BYERS COMPANY, OF PITTSBURGH, PENNSYLVANIA, A CORPORATION OF PENNSYLVANIA

APPARATUS FOR AND METHOD OF HANDLING SKELP

Application filed February 21, 1929. Serial No. 341,819.

This invention relates to apparatus for and method of handling skelp. It relates more particularly to the handling of skelp as it is being charged into a welding furnace for forming lap weld pipe.

It has for sometime been the customary practice in charging skelp into a welding furnace in forming lap weld pipe to charge pieces of bent skelp alternately to a pair of charging gutters in the furnace. These gutters are normally provided in the hearth of the furnace, one on each side of the center line thereof, and usually considerably removed from the center line. Nearer the center of the furnace is a pair of welding gutters, one on each side of the center line, but in close proximity thereto. The usual practice, as stated above, has been to first bend the pieces of skelp, and then feed such pieces alternately, first in one charging gutter, and then in the other. A laborer known as a turn down is stationed in the pit in front of the furnace and with a suitable tool turns the pieces of bent skelp which have been charged into the respective charging gutters toward the center of the furnace, so that each of such pieces ultimately finds its way to the welding gutter corresponding to the charging gutter into which it was charged. The turning operation is most expeditiously performed by hand labor, and can be very skillfully done by an experienced man provided with a suitable turning tool. One man customarily turns the pieces of bent skelp from both sides of the furnace, working first on one side and then on the other.

The skelp comes to the welding furnace from the drawbench where it is bent into substantially tubular shape. It is supplied to the furnace by a charging machine which comprises a trough mounted on a suitable carriage, which carriage is adapted to be moved transversely across the furnace pit from one side of the furnace to the other. This machine is also equipped with suitable pusher arms for the purpose of pushing the pieces of hot bent skelp received from the drawbench into the welding furnace, and thence, after the skelp has been heated in the welding furnace of the proper temperature, pushing the heated skelp into the welding roll machine which is situated at the opposite end of the furnace.

The method of operation in the pit of the furnace, according to usual practice, is substantially as follows: The charging machine is first brought into a position to receive a piece of hot bent skelp from the drawbench, after which it moves across the face of the furnace and stops in line with one of the charging gutters, for example, that farthest removed from the drawbench. The skelp is then pushed out of the charging machine into the charging gutter. The charging machine then moves back across the pit to its first position to receive a second piece of hot bent skelp. While the charging machine is receiving such second piece of skelp the turn down introduces his tool into the furnace and rolls or turns the first piece of skelp toward the center line of the furnace where it eventually finds its way into the welding gutter corresponding to the charging gutter into which it was charged. On completing this work the turn down leaves his position near the furnace, in order to get out of the way of the charging machine, so that it may come into position in line with the second charging gutter to charge the second piece of skelp. After the charging machine has charged the second piece of skelp into the second charging gutter the turn down returns to his post immediately in front of the furnace and turns the second piece of skelp toward the center line of the furnace and toward the welding gutter corresponding to the second charging gutter. Having done this the turn down must again move away from the front of the furnace to permit the charging machine to move across the pit to bring a third piece of skelp into line with the first charging gutter. Such third piece of skelp is charged into the charging gutter, whereupon the machine moves back across the pit toward the drawbench, and the turn down then returns to his position, and turns the third piece of skelp. He must then again move away from the furnace while a fourth piece of skelp is charged into the second charging gutter. This procedure is repeated ad infinitum, it being necessary for the turn down to move away from the front of the furnace each time a new piece of skelp is charged.

It is also necessary at intervals to move the charging machine in line with the respective welding gutters to push the skelp out of the furnace and into the welding roll machine. This operation is performed by the welder and his helper together with the machine, and each time the machine is moved to and from the position in alignment with the respective welding gutters the welder and his helper have to move out of the way.

The turn down and the welder and helper have to take a great many steps in the course of a day's work merely for the purpose of getting out of the way of the charging machine. Not only does this consume valuable time, but it also tires the men and reduces their efficiency. It cuts down the production of the mill, and increases the cost of the product.

Various attempts have been made to obviate the disadvantages above described, including, among others, the proposal to charge the skelp into the back or roll end of the furnace.

I provide a method of and apparatus for handling skelp which obviates the disadvantages referred to. I provide a method and means for charging hot bent skelp into a furnace while leaving the charging pit and the turn down post unobstructed, so that the turn down may remain in position at all times, and need not move away from the front of the furnace to get out of the way of the charging machine.

I provide apparatus for handling skelp, comprising a plurality of charging means in spaced side by side relationship for charging the skelp into a furnace, and transfer means cooperating therewith, the transfer means being removed from the furnace and adapted to transfer skelp transversely of the respective charging means.

I further provide a method of handling skelp, comprising delivering a piece of skelp to a charging means, and then delivering another piece of skelp to a second charging means by moving it generally around rather than across the first mentioned charging means.

Other advantages of the invention will become apparent as the following description of a present preferred embodiment thereof proceeds.

Figure 4:
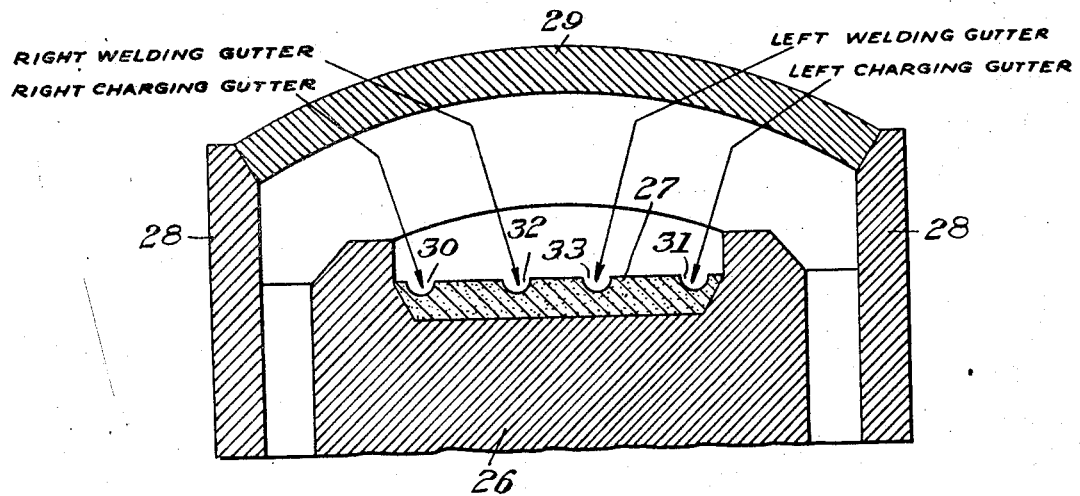

In the accompanying drawings I have shown a present preferred embodiment of the invention wherein Figure 1 is a diagrammatic plan of a lap weld pipe mill, Figure 2 is a diagrammatic elevation of a portion of the pipe mill shown in Figure 1, Figure 3 is a cross-section of the line III—III of Figure 1, and Figure 4 is a cross-section on the line IV—IV of Figure 1.

Referring more particularly to the drawings, reference numeral 2 designates generally a skelp loading rack from which pieces of skelp in substantially flat condition are delivered to the skelp charger 3. The skelp charger charges the skelp into the bending furnace 4, from which the skelp passes through a scarfing roll machine 5, and thence to a scarfing table 6. During the scarfing operation the edges of the skelp, which is still substantially in flat condition, are prepared for the subsequent lap welding operation whereby they are joined to form a pipe or tube. From the scarfing table the skelp passes to a drawbench 7 where it is bent into generally tubular shape, although the scarfed edges are not joined together. The skelp as it leaves the drawbench is therefore in substantially the proper shape to be welded and it is next charged into a welding furnace and thence into a welding roll machine as will be presently described.

Laterally disposed with respect to the drawbench is a transfer rack 8, which receives the pieces of hot bent skelp from the drawbench and transfers them to the mechanism for delivering and charging the skelp to the welding furnace. Such mechanism comprises a transfer trough 9, disposed to receive skelp directly from the transfer rack, and provided with positively driven rollers 10. Disposed beside the transfer trough is a charging trough 11, which, for convenience, may be referred to as the left charging trough. This charging trough is also provided with driven rollers 12, whereby the hot bent skelp may be positively moved along the trough by rotation of the rollers. Adjustable skids 13 are provided which in one position permit the hot bent skelp to be delivered directly to the transfer trough, and in another position bridge the transfer trough so that the skelp passes over such trough and into the left charging trough above mentioned.

Disposed substantially parallel to the left charging trough, but on the opposite side of the center line of the welding furnace, is a second charging trough 14 provided with driven rollers 15, which, for convenience, may be referred to as the right charging trough. The right charging trough extends back away from the furnace considerably farther than does the left charging trough for a purpose to be presently described.

Mounted upon rails 16 at the rear of the transfer trough and charging troughs is a transfer buggy 17, having a skelp receiving trough 18 provided with driven rollers 19. The transfer buggy is transversely movable upon the rails 16 to assume a position wherein its trough 18 is in line with the transfer trough, and to assume a second position wherein the buggy trough 18 is in line with the right charging trough 14. The transfer buggy is adapted to receive skelp from the transfer trough and after having been transversely moved to a position in line with the right charging trough 14 is adapted to discharge the skelp into such trough. The transfer buggy, therefore, serves as a means for supplying skelp to the right charging trough while at all times maintaining such skelp away from the immediate front of the furnace until the skelp is charged into the furnace by means of the right charging trough.

The welding furnace is designated generally by reference numeral 20, and the usual pit at the charging end of the furnace by reference numeral 21. The skelp delivered to the right charging trough by means of the transfer trough and the transfer buggy does not traverse the pit but passes a considerable distance to the rear thereof before being moved transversely toward the line of the right charging trough. The pit is thus at all times kept free and unobstructed so that the turn down working in front of the furnace, as well as the welder and his helper, need not continually move out of the way of a charging machine, as has heretofore been necessary.

Mounted above the pit upon columns 22 is an overhead charging machine 23, which comprises a carriage 24, movable longitudinally of the charging troughs and above the same. The carriage 24 is provided with downwardly extending arms 25 which are adapted to cooperate with skelp lying in the charging troughs to assist in pushing such skelp into the welding furnace. The charging machine is disposed entirely overhead and only the arms 25 extend downwardly therefrom, such arms, however, being so disposed as to reach downwardly only far enough to engage the skelp in the respective charging troughs to push it into the furnace. Therefore, the pit is entirely free for uninterrupted work of the turn down, the welder and his helper, who not only need not continually move out of the way of the charging mechanism but also are protected from the movement of any such mechanism or skelp carried thereby. The turn down may stand substantially in the same place throughout his tour of duty and turn the respective pieces of skelp charged into the furnace by the respective charging troughs inwardly toward the center of the furnace as will be presently described.

The welding furnace comprises a base 26 upon which is a hearth 27. Supported upon side walls 28 is the furnace roof 29 which, as shown, is in the shape of an arch. The hearth 27 is provided with right and left charging gutters 30 and 31 respectively, which charging gutters are in line with the right and left charging troughs respectively, so that skelp fed by the respective charging troughs to the furnace is delivered directly into the respective charging gutters. Also disposed in the hearth 27 of the welding furnace are right and left welding gutters 32 and 33, respectively, which welding gutters are in line with the welding rolls of the welding roll machine to be presently described. The hearth of the furnace is substantially flat intermediate the respective charging and welding gutters, and is adapted to support the pieces of hot bent skelp as they are turned by the turn down. As above mentioned, the turn down standing unobstructed in the pit in front of the furnace introduces his tool into the furnace and turns the respective pieces of skelp inwardly from the respective charging gutters until the same reach the respective welding gutters. During this time the skelp is being raised to a welding heat.

The overhead charging machine has one of its pusher arms 25 disposed substantially on the center line of the furnace. This pusher arm (Figure 3) is adjustable to move either to the right or to the left to engage skelp lying in the respective welding gutters of the furnace to assist in discharging such skelp from the furnace and feeding it to the welding roll machine.

The welding roll machine 34 may be of usual or well known construction, and receives the hot bent skelp from the welding gutters of the furnace and welds the edges of such skelp together to form a pipe or tube. The usual bar puller 35 is provided at the opposite end of the welding roll machine.

Referring briefly to the operation of the charging and transfer mechanism, a piece of hot bent skelp from the transfer rack may first be delivered to the transfer trough 9. Such piece of skelp by rotation of the rollers 10 is moved toward the left, viewing Fig. 1, into the trough 18 of the transfer buggy 17. The transfer buggy is then moved to the position shown in chain lines in Figure 1 in line with the right charging trough 14. By rotation of the rollers 19 in the transfer buggy the skelp is then delivered from the buggy to the right charging trough and by rotation of the rolls 15 in the right charging trough the skelp is charged into the right welding gutter with the assistance of the overhead charging machine 24. While this operation is taking place a second piece of skelp is delivered from the transfer rack over the skids 13 and into the left charging trough 11. The skids are adjustable at will to permit skelp to be delivered directly into the transfer trough or to cause such skelp to pass over the transfer trough and into the left charging trough.

The piece of skelp delivered to the left charging trough is charged into the left charging gutter of the furnace by rotation of the rollers 12. By the time this operation is well under way the transfer buggy will have returned to its position in line with the transfer trough and a third piece of skelp is then delivered from the transfer rack to the transfer trough, thence to the transfer buggy and finally by means of the right charging trough into the right charging gutter of the furnace in the same manner as above described. The turn down is at his post in the pit in front of the furnace and turns each piece of skelp inwardly toward the respective welding gutter to which it is directed, as above described.

By reason of the fact that the turn down, the welder and the welder's helper may remain in substantially the same position throughout their entire tour of duty and need not continually move out of the way of the charging mechanism, a great advantage and a considerable saving is realized. Furthermore, the pit in front of the furnace is open and the furnace and the transfer and charging mechanism are more easily accessible for adjustment and repair. The transfer means at the rear of the transfer trough and the charging troughs may be a conveyor or other means than a transfer buggy, although the use of such a buggy has an additional advantage in that when it is moved to one side a clear approach is left to the pit and the front of the furnace making it very easy to move in and out and to reach the various mechanisms for repairs, or for the removal of defective pipe as may be necessary.

While I have shown and described a present preferred embodiment of the invention it is to be distinctly understood that the same is not limited thereto, but may be otherwise variously embodied and practiced within the scope of the following claims.

I claim:

1. Apparatus for handling skelp, comprising a plurality of charging means, means for conveying skelp thereto, and transfer means for transferring skelp transversely with respect to the charging means, such transfer means extending out longitudinally with respect to the charging means.

2. Apparatus for handling skelp, comprising a plurality of charging means, delivery means for delivering skelp to one of such charging means, and transfer means for receiving skelp from the delivery means and transferring it to another of the charging means at a portion thereof removed from its discharge portion.

3. Apparatus for handling skelp, comprising a plurality of charging means, delivery means for delivering skelp to one of such charging means, transfer means, and adjustable means for delivery of skelp from the delivery means to the transfer means, the transfer means being effective for transferring the skelp to another of the charging means at a portion thereof removed from its discharge portion.

4. A method of handling skelp, comprising delivering pieces of skelp from a delivery means alternately to a charging means and a transfer means, and moving the skelp delivered to the transfer means in a circuitous path to a second charging means.

5. In a lap-weld mill, a furnace provided at the charging end with a plurality of charging openings, apparatus for handling bent skelp comprising a plurality of charging means in spaced side by side relationship for charging skelp into the furnace, stations for operators between the charging means wherein the operators are able to move freely at all times while at work, a conveyor disposed beside one of the charging means for conveying skelp in a direction generally away from the furnace, and transfer means for receiving skelp from the conveyor, such transfer means being permanently situated in a position further removed from the furnace than the conveyor and being provided with movable means whereby to transfer generally transversely of the furnace the skelp received from the conveyor and to deliver the same to at least one of the charging means for introduction into the furnace without danger to the operators stationed immediately in front of the furnace.

In testimony whereof I have hereunto set my hand.

AMOS S. KAMERER.